Sept. 18, 1962  E. R. BILLINGTON  3,054,529
GAS DISPENSING SYSTEM
Filed April 22, 1960  3 Sheets-Sheet 1

INVENTOR.
Evans R. Billington
BY
Atty.

Sept. 18, 1962 E. R. BILLINGTON 3,054,529
GAS DISPENSING SYSTEM

Filed April 22, 1960 3 Sheets-Sheet 2

INVENTOR.
Evans R. Billington
BY
Atty.

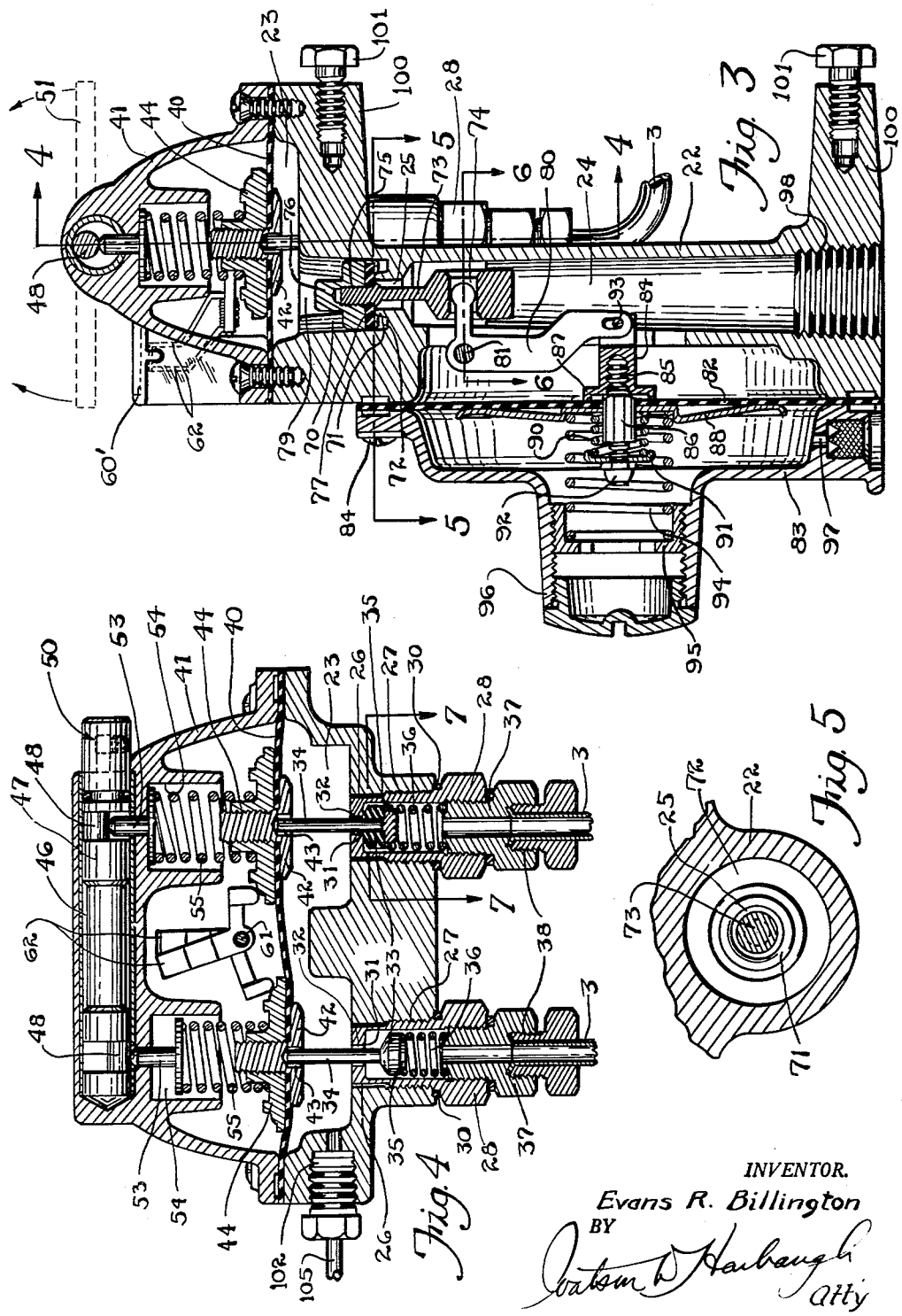

United States Patent Office 3,054,529
Patented Sept. 18, 1962

3,054,529
GAS DISPENSING SYSTEM
Evans R. Billington, Lincolnwood, Ill., assignor to The Bastian-Blessing Company, Chicago, Ill., a corporation of Illinois
Filed Apr. 22, 1960, Ser. No. 25,170
15 Claims. (Cl. 222—6)

The present invention relates to liquefied petroleum gas dispensing systems and more particularly to pressure reduction and automatic selectivity between two sources of gas under high pressure to provide an uninterrupted supply of fuel gas at a substantially unvarying household pressure with a built in wide angle viewing service-and-reserve indicator to minimize attention of the operator and customer. This application is a continuation-in-part of my application Serial No. 480,693, filed January 10, 1955, for Gas Dispensing System, which application is now abandoned.

In order to provide an uninterrupted supply of fuel gas to individual homes which do not have available to them municipal or community supplied fuel, portable tanks are employed to supply a liquefied petroleum gas such as propane in its vapor phase at a substantially unvarying household pressure to a dwelling for use in household appliances and heating. These tanks have outlet connections so that each tank, when empty, may be detached and replaced by a full tank.

As a general rule, two tanks are allocated for each installation, one operating on "service" and the other standing by for "reserve." The tanks are installed outside of a dwelling where they are exposed to the atmosphere and the changing temperatures. Safety requires this and the place of installation is one where they are also readily available for inspection and handling. In many instances where there is a choice of locations, the one is chosen where the tanks are most likely to be observed by the dwelling occupants in their movements outside of the house.

The tanks employed are generally the tall I.C.C. cylinders and when they are mounted, preferably upon a platform appreciably above the level of the ground, side by side, with a pressure regulating manifold located above them where it can easily be connected to the tanks by pigtails, preferably of copper tubing, so that as each tank is emptied it may be detached and replaced by a full tank.

The fuel employed, such as propane, must have a low boiling point so that there will be adequate dispensing pressure throughout the winter. However, due to summer temperatures, the tank pressure during summer months is quite high. For instance, at —10° F. the pressure drops to approximately 15 pounds per square inch, whereas during summer temperatures the pressure easily reaches 150 p.s.i.g. or more on hot days. The service pressure of the gas at the appliance should be 11 inches of water column. To maintain a constant service pressure is a long existing problem in the industry where the tank pressures vary as much as or even more than 800% or 8 to 1 in the temperate zone and more than this in the colder zones.

In the present invention two first stage pressure reducing regulators are provided which can be alternately set to deliver gas at two different pressures from the two tanks. The regulator delivering the higher pressure is the one that is operating on "service" and the higher pressure maintains the closure of the low pressure regulator until the service tank empties and the pressure delivered therefrom drops to that at which the low pressure regulator will open. Thereafter, the system will operate with the low pressure regulator delivering gas from the "reserve" tank.

Moreover, an improved indicator responsive to the change in pressure occurring when the service tank is emptied is provided which will visually indicate whether or not the system is working upon "service" or "reserve" tank. Whenever it indicates reserve operation, the person observing the indicator can notify the tank supplier and a new tank will be brought out to replace the empty one. The operator when attaching the full tank changes the pressure delivery relationship of the two regulators with a manual throwover control so that the one previously working upon reserve thereafter performs as a service tank and the full tank serves as the reserve tank until the next change of tanks occurs.

A full view of the indicator and its ready readability are important factors in the operation of the system because once the system goes on reserve and the indicator so indicates, there is no way of conveniently telling how long it has been on reserve. Therefore, the sooner this can be detected the easier it is for the operator to provide uninterrupted service without need for emergency calls. For these reasons an indicator which provides a high degree of contrast between its two alternate positions, and the more readily it is seen or draws the attention of the observer without confusion of refracted light at the surface of a window, the greater are the opportunities that the householder will have his attention drawn to the fact that the system is operating upon reserve.

Moreover, the wider the horizontal and the vertical range of view the more likely it will be seen, merely in passing the installation as distinguished from stopping to peer and investigate.

One of the objects of the present invention is to provide an economical and safe apparatus to supply propane stored in outside containers to the appliances of a dwelling at a constant service pressure within plus or minus tolerances of 5% throughout a load varying from 4 to 200 cubic feet per hour.

Another object of the invention is to provide a unitary pressure control means for a system of the class described which automatically changes the fuel supply from one to the other of two storage containers in a first stage reduction system that operates on a pressure differential of as much as 2 to 1 to assure maintaining full volume in a standby or reserve container without it gradually depleting itself under heavy withdrawals of gas from the service container.

A further object of the invention is to insure the safe handling by inexperienced persons of propane fuel which involves many hazards other than high pressures that are not appreciated by users.

Another object of the invention is to provide an improved gas service control apparatus which is unitary in construction, fool-proof in operation, easy to maintain and service including removable unitary valve assemblies and capable of operating uniformly within manufacturing tolerances without need for special adjustment.

The invention is also characterized by an improved warning signal connected into the controlling mechanism which will fulfill the above mentioned desirable characteristics and give warning when a changeover from one container to the other has taken place, as when the service tank is empty and the reserve tank is carrying the load.

Another object of the invention is to provide a highly efficient indicator with a wide range of visibility which is inexpensive to manufacture and requires no servicing, yet is weather and moisture proof and self cleaning under weather conditions.

A further object of the invention is to provide a direct reading indicator which can be read in a horizontal direction up to thirty feet away and will utilize light directed to it from any one of a number of directions, particularly light that may be provided by the viewer with a flashlight, yet will maintain a complete black light contrast under all lighting conditions.

These being among the objects of the invention, other and further objects will become apparent from the drawings, the description relating thereto, and the appended claims.

Referring now to the drawings:

FIG. 3 is a vertical cross section taken on line 3—3 of FIG. 2;

FIG. 4 is a cross section taken on line 4—4 of FIG. 3;

FIG. 5 is a fragmentary cross section taken on line 5—5 of FIG. 3;

The invention involves in combination with liquefied petroleum gas storage tanks subjected to a wide range of temperatures, a unitary two stage pressure reducer in which there is a first stage reducer for each tank with a common outlet chamber at the inlet of the second stage regulator. Both stages have stem type valves which open against the direction of flow so that both the upstream pressure and the current of the flowing gas operate to urge closure of the valves. An improved indicator which provides a constant load upon the first stage regulators is employed to signal a changeover from operation of one valve at preferably 12 p.s.i.g. output pressure to the other valve which is set to operate preferably at 6 p.s.i.g. output pressure.

The indicator includes a variably positioned signal means in a darkened cavity behind a window which is covered by a light refractive material, such as Lucite, shaped like a prism with the lateral surface at the front of the prism disposed vertically and the back face from the top thereof inclined downwardly and rearwardly at an angle of 45°. The bottom of the prism is coated with a black paint around an upwardly deeply recessed window opening portion whose face is clearly transparent but preferably finely corrugated with corrugations extending parallel to the front face. With this arrangement light from any direction is transmitted through the prism and through the face and recess sides of the clear window to the surface of any indicator flag that may be present below the window. This light from any source can be seen by an observer from any direction within a range of approximately 90° in front of the front face and 130° around and over the prism.

Figure 1:
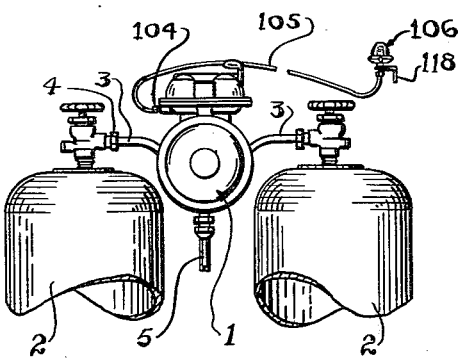
FIG. 1 is a fragmentary front elevation view showing the regulation mechanism unit mounted in its normal place on a pair of gas cylinders.
Figure 11:
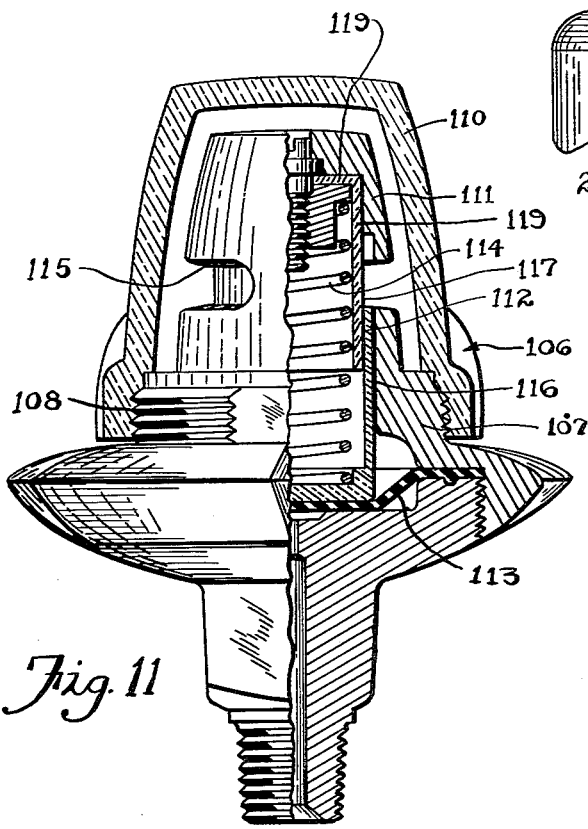
FIG. 11 is a partially sectional view of a preferred form of indicator for remote use with the indicator indicating low-pressure tank conditions.
Figure 7:
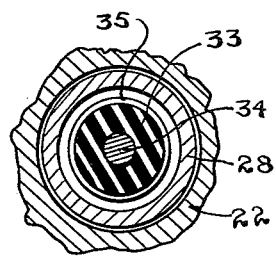
FIG. 7 is a fragmentary cross section taken on line 7—7 of FIG. 4.
Figure 8:
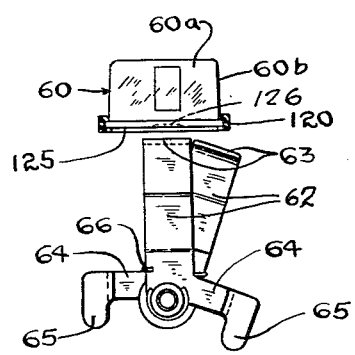
FIG. 8 is an enlarged view of the detail assembly of the warning service-reserve signal or semaphore with a wide range of visibility provided with the signal reflected horizontally.

Referring now to the drawings, the gas dispensing system is shown in FIG. 1 where the unitary two-stage regulator assembly 1 is connected to two portable storage tanks 2 by means of flexible conduits or pigtails 3. The tanks are located above ground where they are subjected to variations in atmospheric temperatures and the valve assembly is suitably mounted for support independently of the tanks upon a bracket attached to a dwelling or post. The tanks are connected and disconnected in a conventional way at 4 with respect to the regulator assembly 1. The gas is vaporized in the tanks and the vapor is conducted from the tanks through the pigtails 3 into the regulator assembly 1 where it is reduced to its proper pressure and forwarded to the gas consuming appliance by means of a service conduit 5. The prismatic window viewer is shown at 60 and the remote indicator at 106.

Figure 2:
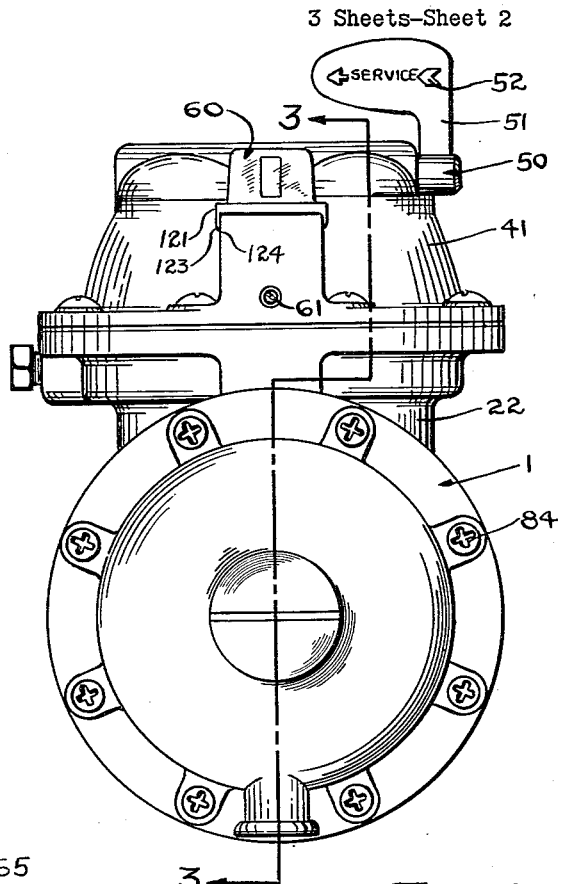
FIG. 2 is a front elevation view of the unit.
Figure 9:
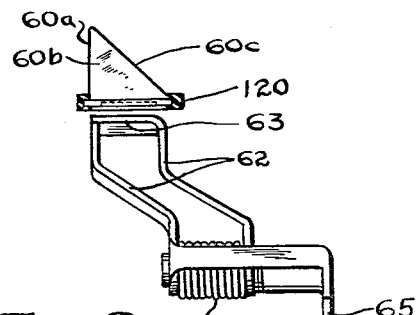
FIG. 9 is a side elevation view of the detail assembly of FIG. 8.
Figure 6:
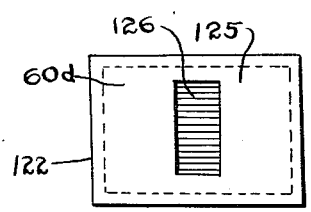
FIG. 6 is a fragmentary cross sectional view taken on line 6—6 of FIG. 3.
Figure 13:
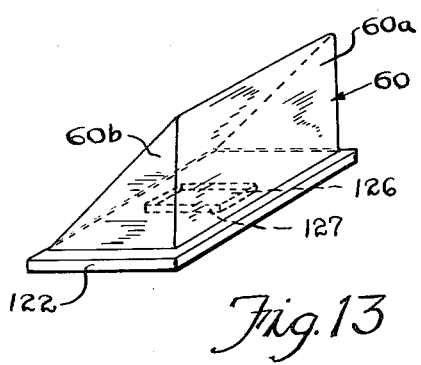
FIG. 13 is a perspective view of the prismatic viewer shown in FIG. 12.
Figure 12:
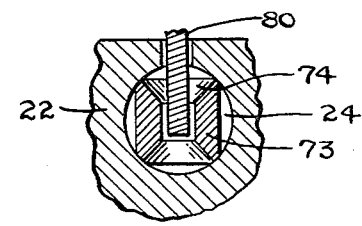
FIG. 12 is a bottom view of the prismatic viewer shown in FIGS. 2, 8 and 9.

In FIGS. 2 and 3 the detailed construction of the regulator assembly 1 is shown in which the main body 22 is made up of a single casting or forging having two cavities 23 and 24 in communication with each other through a valve port 25. The cavity 23 is the valve chamber of the first stage regulators, and the cavity 24 is the valve chamber of the second stage regulator.

At the bottom of cavity 23, two threaded openings 26 are porvided to receive removably therein unitary valve assemblies which include valve seat cages 28 in threaded relationship at 27 as sealed by the washer 30. Both valve cages 28 are reduced at their upper ends and machined to provide preferably a conical valve seat 31 and a valve port 32 therethrough. Closing upon the valve seat is a conical valve disc 33 preferably made of an elastomer bonded to the valve stem 34 which extends upwardly through the port 32.

The back side of the valve disc 33 is supported by a shoulder on the stem to engage the valve disc and force it upwardly to close the valve as spring-pressed by a compression spring 36 that is held in place by a back cap member 37 threaded into the valve cage. The back cap has an opening therethrough leading from the interior of the valve cage to a threaded opening 38 in the bottom of the back cap which receives the outlet end of the pigtail 3.

Across the face of the wall defining the cavity 23 is disposed a diaphragm 40 held in place by a bonnet member 41. Cooperating with the upper end of the valve stem 34 is a yoke 42 recessed as at 43 to receive the upper end of the stem in nested relationship. The head of the yoke 42 is disposed upon the bottom side of the diaphragm with a central threaded portion extending through the diaphragm to receive the diaphragm plate 44 thereon in order to clamp the diaphragm in sealed relationship between them.

At its upper end the bonnet 41 has a transversely extending cylindrical opening 46 therethrough with a shaft 47 journalled therein as provided with cams 48. The rise of the cam at one end of the shaft is disposed at 180° from the rise of the cam at the other end of the shaft, and the relative position of these cams in the bonnet is determined by an indicator assembly 50 having a flag or handle 51 thereon with indicia and arrows 52 on opposite sides thereof pointing in opposite directions. Intersecting the bore of the opening 46 is a spring button whose stem 53 engages and is displaced by the cam 48 as the flag 51 is rotated through an arc of 180°. The lower end of the button 53 is disposed in a cylindrical guideway 54 and between the head of the spring button and the diaphragm washer is disposed a compression spring 55.

Not only does the stem 53 of the spring button hold the shaft against axial displacement, but when the cam forces the spring button downwardly, it compresses the spring 55 in a direction urging the opening of the valve 33 through displacement of the valve stem 34 against the effort of the back cap spring 36.

In its preferred embodiment, when the tension upon the bonnet spring 55 is at the minimum, as when the spring button is at its uppermost position, the relative effort of the springs 55 and 36 is such that the pressure of gas at six pounds, gauge, exerted against the bottom of the diaphragm 40 will operate to close the valve 33 against the valve seat 31, but, when the compression of the spring 55 is at maximum as when the stem of the spring button is forced downwardly to its lowermost position by the cam 48, the valve 33 will remain open until twelve pounds of pressure is present in the valve chamber 23.

A prismatic viewer 60 is provided for securement in the bonnet 41 as described later, and mounted upon a pin 61 extending midway between the two diaphragm plates are two elements 62 which are arranged to have an upper horizontally disposed portion or semaphore 63 painted red pass in and out of coincidence immediately below the prismatic viewer depending upon the relative position of the diaphragm plate. The mechanical linkage for accomplishing this includes an arm 64 having a toe 65 resting on top of the diaphragm plate, which serves as a lever to move the upper end portion 63 laterally out of sign with respect to the viewer when the diaphragm plate is in its uppermost position, and move it into coincidence with the viewer when the diaphragm plate is down, as shown in the left hand side of FIG. 4. A torsion spring 66 mounted upon the pin 61, normally urges the toe 65 downwardly to follow in engagement with the diaphragm plate. Thus, whenever the diaphragm plate is down, one of the semaphores is exposed, the red color on its upper face is readily apparent through the viewer.

Such a signal indicates that one or the other of the diaphragm plates is displaced downwardly and the system is running upon the "reserve" tank. The tank supplier is called and a full tank is brought out. Thereupon, the flag 51 is manually moved through 180° to reverse the relative tensions upon the spring 55, thereby placing the "reserve" tank on "service" and raising the pressure in the valve chamber 23 to nominally twelve pounds to hold closed the valve to the tank being changed and prevent any escape of gas from either tank during the changeover, the empty tank which was in service is then removed and replaced by a full one. The tank that had been operating upon reserve is now operating as the service tank, and the full tank stands by as reserve.

Considering now the second stage pressure regulator, it will be noted that a cup 70 is provided above the valve port 25, and the side walls thereof taper downwardly to a point below the level of the valve seat 71 to form an annular chamber 72 around the valve seat 71. The tapered walls are modified in a predetermined way either by clearance control or cutaway sections as shown to form notches 79 which determine the maximum flow characteristics and pressure of gas ultimately dispensed at service pressure. The valve itself comprises a stem 73 with a transverse opening 74 in an enlargement at the lower end thereof. The upper end of the stem 73 is threaded as at 75 to receive a valve disc supporting member 76 which works with a comparatively close clearance between its periphery and the tapering side walls of the cup 70. Within the recess on the bottom end of the valve disc carrier is a valve disc 77 preferably made of an elastomer such as Neoprene.

The valve is actuated through a yoke assembly which includes a linkage lever 80 pivoted at 81, by a diaphragm 82 which closes the cavity 24 as held in marginally sealed relationship by a bonnet 83 bolted to the body 22 by screws 84. The linkage lever 80 is driven by the diaphragm 82 through an interconnecting diaphragm nut 84a pivoted to the lever 80 and threaded as at 85 to receive a stem 86 which extends through the diaphragm. The marginal edge 87 of the nut 84a engages the diaphragm in sealed relationship. Received upon the stem 86 is the diaphragm plate 88 held against the diaphragm by a compression spring 90 held in place by a spring washer 91 and nut 92.

With this arrangement, whenever the valve 71 is closed and the pressure in the chamber 24 is higher than desired, the lever 80, through its connection 93, prevents the diaphragm nut 84a from moving outwardly beyond a predetermined point. Once this point is reached, any additional pressure upon the diaphragm moves the diaphragm plate and the diaphragm outwardly against the tension of the spring 90 and permits excess pressure to reach atmosphere between the diaphragm and the edge 87 of the diaphragm nut in a manner providing a safety relief valve arrangement.

The diaphragm is urged to open the valve 71 through the lever 80 by a bonnet compression spring 94 whose tension is established by the adjusting screw 95 threaded into the bonnet boss 96. A bonnet breather opening is indicated at 97. Gas flows from the chamber 24 through an outlet opening at 98 threaded to receive a service line 5.

On the back side of the body are provided bosses 100 which are drilled and threaded to receive bolts 101 for mounting the regulator assembly upon a supporting structure (not shown).

An opening 60′, as shown in FIG. 3, is recessed and the prismatic viewer 60 made of clear molded plastic, such as clear Lucite, is mounted in the opening 60′ with a marginal pressure sealing gasket 120 and a clamp-on frame 121. For this purpose the bottom face 60d has a lip 122 on all four sides embedded in the flexible rubber gasket 120 to provide an edge by which the prism is clamped and fastened to the body by the frame 121. The frame 121 has bendable ears 123 on the bottom edge thereof upset into recesses 124 in clamping relationship to hold the frame and prism in place. The upper portion of the prism is provided with vertical front 60a and side 60b view surfaces disposed substantially at right angles to a horizontal line of sight. The rear refractive side 60c is inclined to the horizontal at an angle of approximately 45°.

Inasmuch as the semaphores 63 of the signal means move sidewise below the prism, only the middle third of the bottom face is kept clear so that the semaphores come into view in this middle third while the remaining portions are blocked off from view by a black coating 125 integrated upon the bottom of the prism. This central third of the prism is off-set upwardly a substantial distance to provide a clear portion or window 126 bordered by clear vertical wall 127 which is untouched by the roller which applies the black coating 125 to the remainder of the bottom of the prism. It is important that the black coating be supported directly in integrated contact with the bottom face 60d of the prism rather than be a separate element placed beneath the prism because this eliminates any reflection which might show as a light or silvery reflection around the central portion 126. The application of the black masking directly to the bottom of the prism absorbs the light directly without refraction at the interface and provides a completely black appearance comparable to the effect of the darkened space below the transparent central portion when the semaphores 63 are located laterally thereof.

With the prism thus formed, light from any direction finds its way to the central portion to be directed against the semaphore. Light from the front refracts from the inclined surface 60c downwardly. Light from the top or back passes through the back directly thereto, and light from the sides 60b as well as from the front and back are caught and passed through the transparent walls 127 of the recess window 126 to the semaphores. This lighting relationship is important because the regulator nut may be located under a protective hood or overhang and only light from the front and sides may be reaching the prism. Nevertheless, a person passing by the regulator can see the semaphore at a glance in the day time under all conditions of installation, and a flash light beam directed horizontally at night will also provide the same result.

Moreover, since all exposed surfaces are either vertical or appreciably pitched, the prism is self cleaning without dust or moisture accumulating thereon. Rain washes the surfaces clear and the low heat conductivity of the material of which the prism is made rejects the formation of frost thereon. Moreover, being projected above the rim of the frame 121, the surfaces can be wiped quite easily to provide bright surfaces and light transmission if other conditions of an unexpected character happen to cloud the surfaces.

For purposes of supplementing the indicators 60 and 63, if desired, a threaded opening 102 is provided in the body leading into the first stage regulator chamber 23 to receive a connector 104 carrying copper tubing 105 which leads to a remote indicator assembly 106 described and claimed in my Patent No. 2,850,900. Briefly, this assembly comprises a body 107 externally threaded as at 108 to receive a transparent cup-shaped cover 110 thereon. Within the cover is a boss 111 having a cylindrical cavity receiving a valve stem 112 carried by a diaphragm 113. The diaphragm is urged to its lowermost position by a compression spring 114. A green marking 116 upon the stem 112 is brought into coincidence with a window 115 when the pressure in the body 107 below the diaphragm is approximately twelve pounds. This pressure is enough to compress the spring sufficiently to force the diaphragm and stem upwardly. Then when the pressure in the body 107 drops to approximately six pounds, the diaphragm is moved to its lowermost position to carry the stem 112 downwardly to expose through the window 115 a red marking 117 upon a cup 119 which telescopes within the stem 112 at the level of the window 115. Thus, depending upon the length desired in the copper tubing 105, the remote indicator 106 can be located outside a kitchen window or other suitable place by the bracket 118 where the indicator assembly is in full view to indicate the relative depletion of the tanks without the user examining the indicator below the prismatic viewer 60.

In operation, assuming that the customer has installed two new cylinders of gas, he will then throw the flag 51 one way or the other depending upon which tank he wishes to put into "service" first. The corresponding arrow 52 will indicate which tank is in service. The first stage regulator connected to the tank placed in service will have its compression spring 55 compressed to provide the higher pressure such as a twelve pound working pressure in the first stage chamber 23. This pressure being superior to the lower reserve pressure of about six pounds at which the other spring 55 and valve is set to close will cause both diaphragm plates to move to their uppermost position, in which position the indicators 63 are moved out of coincidence with the prismatic viewer 60.

When the service tank is exhausted, the pressure will fall until it approaches six pounds, at which time the other first stage regulator connected to the reserve tank will take over and come into operation to maintain the pressure in the first stage chamber at six pounds. During the operation of the first stage regulators at six pounds, the twelve pound spring and valve will be forced to its wide open position in which the indicator, cooperating therewith, will move from a side position into a position in coincidence with the prismatic viewer to indicate red.

Not only will this change in indication take place, but there will also be a change in the indication in the remote gauge assembly 106. The pressure dropping to six pounds will permit the valve stem 112 to move downwardly as urged by the compression spring until the red portion is apparent to the viewer.

Once the red indication appears, the supplier of the tanks can be called so that the empty can be replaced with a full one; the flag 51 is then moved 180° and the reserve tank becomes the supply tank and the full tank the reserve tank.

Figure 10:
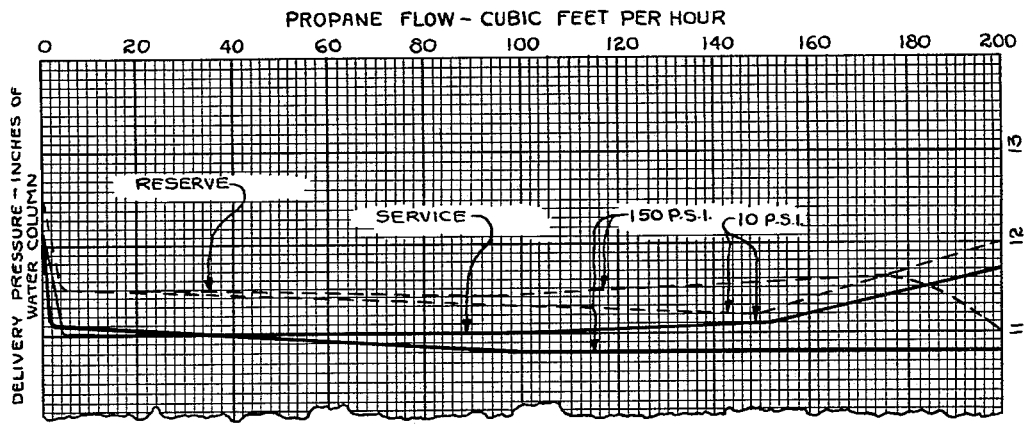
FIG. 10 is a graph or chart which indicates the flow characteristic of the regulator assembly when changed from service to reserve performance.

Referring now to FIG. 10, a chart is given showing the flow performance of the dispensing device comparing tank pressures of ten p.s.i.g. which would occur in cold months with 150 p.s.i.g. which would occur in summer months. The axes of the chart relate the delivery pressure in inches of water column against the cubic foot flow per hour starting with zero and ranging to 200 cubic feet per hour. It will be observed that up to 160 cubic feet per hour the ten p.s.i.g. tank pressure causes very little difference in service pressure regardless of whether or not the tank is running on reserve of six pounds or service pressure of twelve pounds. Above 160 cubic feet the pressure rises slightly with extra heavy demands which is a desired relationship in dispensing devices of this type. Although there is a little wider difference between the service pressure depending upon reserve or service first stage pressures with the tank at 150 p.s.i.g. the maximum difference is at 160 cubic feet per hour and is about 5%.

By way of explaining the chart and what it shows, it will be noticed that all three valves in the system open against the higher pressure and against the direction of flow of fluid through them. Thus, in the first stage chamber 23, the higher the tank pressure the greater the tendency is for the valve to close against the action of the bonnet spring. Thus for any given rate of flow, the valve opening is less the higher the pressure of the incoming gas to the end that the actual volumetric flow through the valve into the first stage chamber 23 is substantially constant throughout the expected flow range of the regulator.

The second stage pressure regulator operates the same way. If the pressure in the first stage chamber 23 is twelve pounds, that pressure will work to hold the valve nearer to its closed position as assisted by the surge or drag of the flowing gas upon the valve member itself between the valve member and surrounding guide walls. However, when the system is working upon standby or reserve tank at six pounds pressure, the second stage regulator valve will be free to open further to let more gas through at the lower pressure with the end result that approximately the same volume of gas is dispensed at eleven inches of water column as was dispensed with a twelve pound applied pressure upon the inlet side of the valve.

With this arrangement of the elements, a wider range of pressures between service and standby conditions is made possible so that the upper pressure in the first stage chamber is sufficiently high to assure complete closure against any possible seepage or depletion of the reserve tank at the reserve tank valve. This also makes it possible to have enough power in the system to operate semaphores and signal devices safely and accurately.

Consequently, having thus described the invention, its operation and characteristics, it will be readily apparent to those skilled in the art how the objects stated are fulfilled, and how various changes and modifications can be made in the apparatus to practice the invention, the scope of which is commensurate with the appended claims.

What is claimed is:

1. In a gas dispensing system having a pair of tanks for storing liquefied petroleum gas under pressure exposed to changes in atmospheric temperatures by which latent heat of vaporization is supplied to the stored gas through the walls of the tanks, a pressure reducing device comprising a first stage regulator for each tank having a common valve compartment and including valve elements opening in the same direction with respect to each other and in a direction opposite to the direction of the flow of gas past them, means for selectively controlling each of said valve elements including resilient means for each valve element urging said valve elements to their open position and a member for exerting different pressures simultaneously on said resilient means selectively to deliver gas under different pressures downstream of the valve elements, a second stage pressure regulator including a valve opening in a direction opposite to the direction of flow of said different downstream pressure, means carried by said member for indicating the tank from which gas is being dispensed at the higher of said different pressures, and means separately engaged by said valve elements upon the movement of one of the valve elements to its open position for indicating the valve element through which gas is being dispensed at the lower of said different pressures.

2. In a gas dispensing system having a pair of tanks for storing liquefied petroleum gas under pressure exposed to changes in atmospheric temperatures by which latent heat of vaporization is supplied to the stored gas through the walls of the tanks, a pressure reducing device comprising a first stage regulator for each tank having a common valve compartment and including valve elements opening in the same direction with respect to each other and the direction of flow of gas past them, means for selectively controlling each of said valve elements including resilient means for each valve element urging said valve elements to their open position and a member for exerting different pressures simultaneously on said resilient means selectively to deliver gas under different pressures downstream of the valve elements, a second stage pressure regulator including a valve opening in a direction opposite to the direction of flow of said different downstream pressures, means carried by said member for indicating the tank from which gas is being dispensed at the higher of said different pressures, signal elements separately operated by said resilient means upon the movement thereby of its respective valve element to its open position for indicating the valve element through which gas is being dispensed at the lower of said different pressures, and means urging said signal elements into continuous contact with their respective resilient means.

3. In a gas dispensing system having a pair of tanks for storing liquefied petroleum gas under pressure exposed to changes in atmospheric temperatures by which latent heat of vaporization is supplied to the stored gas through the walls of the tanks, a pressure reducing device having a housing with a compartment with a sealed window in the wall thereof, said device comprising a first stage regulator for each tank in said housing including valve stems extending into said compartment, valve elements upon said stems opening in the same direction with respect to each other and opposite to the direction of flow of gas past them into said compartment, means for selectively actuating each of said valve stems including diaphragm means dividing the compartment into chambers and resilient means for each valve element urging the diaphragm means to drive said valve elements to their open position and a member for exerting different pressures simultaneously on said resilient means selectively to deliver gas under different pressures downstream of the valve elements, means carried by said member for indicating the tank from which gas is being dispensed at the higher of said different pressures, and signal elements engaging said diaphragm means separately operated by said resilient means upon the movement thereby of its respective valve element to its open position for indicating the valve element through which gas is being dispensed at the lower of said different pressures, and means urging said signal elements into continuous contact with the diaphragm means at spaced points, said signal elements being moved by said last means into coincidence with said window when its respective valve is open beyond its pressure controlling range of operation.

4. In combination with a plurality of tanks for storing liquefied petroleum gas under pressure, a unitary body having a chamber therein, a conduit leading from each tank and communicating with passageways opening into said chamber, a plurality of valves one for each of said passageways opening in a direction opposite to the direction of flow of gas through said passageways, the valves for said passageways comprising unitary removable valve assemblies, a diaphragm means for said valves, said diaphragm means permitting closure of the valves for said passageways in response to the pressure in said chamber, separate means acting upon each of said valves tending to open said valves, a means for each of said valves effective to alternately increase and decrease compression of the springs for the valves in said chamber selectively and in cooperative relationship and means actuated by the valves for indicating which tank is delivering gas to said one chamber including signal elements independently actuated by said valves with respect to a common position.

5. A pressure indicator comprising a housing having a compartment and a window through the wall thereof, a diaphragm closing the compartment to define a valve chamber, valve actuating elements in said valve chamber spaced from each other normally disposed in contact with said diaphragm in their closed position, separate resilient means for urging said diaphragm to carry said valve actuating elements separately to their valve opening positions, means carried by said housing for exerting different pressure simultaneously upon said separate resilient means, and signal members engaging said diaphragm means at spaced points independently responsive to the position of the valve actuating elements and including elements movable to and from a position of coincidence with said window.

6. In a pressure regulator means for liquefied petroleum gases, a hollow housing, a partition dividing the housing into two chambers, two inlet passageways to one of the chambers, a removable valve assembly in each passageway including a normally closed valve element having a stem thereon extending into said one chamber, pressure responsive means including a diaphragm closing said one of the chambers and including an element engaging each of said stems to open each of said valve elements, a conduit passageway interconnecting said chambers, an outlet pressure regulating means including a second diaphragm closing the second chamber, a valve assembly for said interconnecting passageway having a valve member, a single service outlet from the second chamber, said valve elements and valve member opening in a direction opposite to the direction of flow of gas through these respective passageways, separate means effective upon the valve elements of each of said valve assemblies tending to open them, disposed in spaced relation on said diaphragm, means movable cooperatively to effect selectively said separate means to increase the opening effect upon a selected valve element, said valve member for said interconnecting passageway being secured to said second diaphragm to be closed thereby, and pivoted signal means controlled by each of said diaphragm elements to indicate which one of said two valve elements is open.

7. In a pressure regulator means for liquefied petroleum gases, a hollow housing, a partition dividing the housing into two chambers, two inlet passageways to one of the chambers, a removable valve assembly received in each passageway from the outside of the housing and including a normally closed valve element having a stem thereon extending into said one chamber, a diaphragm closing said one chamber disposed in close proximity to said stems and including an element engaging each of said stems to open each of said valve elements, a conduit passageway interconnecting said chambers, an outlet pressure regulating means including a second diaphragm closing the second chamber, a valve assembly for said interconnecting passageway having a valve member, a service outlet from the second chamber, separate means effective upon the diaphragm elements tending to open the valve elements of each of said valve assemblies, means movable cooperatively to control said separate means and relatively increase the opening effect upon a selected valve element, above that exerted on the other valve element, and pivoted signal means disposed in spaced relationship to each of said diaphragm elements actuated separately by said separate means to indicate when one of valve elements is open.

8. A pressure indicator comprising a body defining a chamber subjected to different pressures, a diaphragm closing said chamber, a bonnet covering said diaphragm and having a window, a pair of spaced apart elements carried by said diaphragm, spaced apart means actuated by each of said elements for movement between two limits with respect to said window and including a signal means carried by each of said spaced apart means, each signal means being moved to an indicating position behind the window by the spaced apart elements where it may be seen through the window when the lower one of the different pressures is present in the chamber, and means for selectively opposing the movement of one of said elements.

9. The combination called for in claim 5 including means for urging said signal members into continuous engagement with said diaphragm and away from said position of coincidence.

10. A pressure indicator comprising a body defining a chamber subjected to different pressures, a diaphragm closing said chamber, a bonnet covering said diaphragm, a transparent prism mounted in said bonnet in sealed relationship having a recessed window in the bottom wall bordered by a transparent frame surrounded over the remaining portion of the bottom wall with an integrated opaque material, a pair of spaced apart elements carried by said diaphragm, spaced apart means actuated by each of said elements for movement between two limits with respect to said window and including a signal means carried by each of said spaced apart means, each signal means being moved to a position behind the recessed window by the spaced apart elements where it may be seen through the prism from the front and top thereof when the lower one of the different pressures is present in the chamber, and means for selectively opposing the movement of one of said elements.

11. A pressure indicator comprising a housing having a compartment and an opening through the wall thereof, a diaphragm closing the compartment to define a darkened valve chamber behind said opening, valve actuating elements in said valve chamber spaced from each other normally disposed in contact with said diaphragm in their closed position, separate resilient means for urging said diaphragm to carry said valve actuating elements separately to their valve opening positions, means carried by said housing for exerting different pressure simultaneously upon said separate resilient means, and signal members engaging said diaphragm means at spaced points independently responsive to the position of the valve actuating elements and including light reflective elements movable to and from a predetermined position behind said opening, transparent prism means sealing said opening and having a bottom wall facing said light reflective elements provided with a recessed window above said position defined by a transparent wall bordered by an opaque coating.

12. A pressure indicator comprising a housing having a compartment and an upwardly opening through the wall thereof, a diaphragm closing the compartment to define a darkened valve chamber below said opening, valve actuating elements in said valve chamber spaced from each other normally disposed in contact with said diaphragm in their closed position, separate resilient means for urging said diaphragm to carry said valve actuating elements separately to their valve opening positions, means carried by said housing for exerting different pressures simultaneously upon said separate resilient means, and signal members engaging said diaphragm means at spaced points independently responsive to the position of the valve actuating elements and including elements movable to and from a position of coincidence with said opening, transparent prism means sealing said opening and having a bottom wall facing said movable elements provided with a deep transparent recessed window above said position defined by a transparent wall bordered by an opaque material adhered to the bottom wall, the upper portion of the prism comprising a light admitting vertical wall beside said recess and an inclined wall contiguous therewith above said recess.

13. The combination called for in claim 11 in which the bottom of the recess is a non planar refracting surface of clearly transparent light diffusing elements.

14. The combination called for in claim 8 in which said window comprises a transparent prism having a viewing face disposed vertically and a transparent refracting surface disposed at an angle above the indicating position of the signal means.

15. The combination called for in claim 8 in which the signal means are disposed to move in a horizontal direction and the window comprises a transparent prism having a vertical front face viewed horizontally and an inclined refracting face viewed from above and through which light is transmitted to the signal means.

References Cited in the file of this patent
UNITED STATES PATENTS
3,001,541 St. Clair _____ Sept. 26, 1961